United States Patent Office
3,816,398
Patented June 11, 1974

3,816,398
11-O-METHANESULFONYLERYTHROMYCINS
John Soloman Tadanier, Chicago, and Jerry Roy Martin, Waukegan, Ill., assignors to Abbott Laboratories, Chicago, Ill.
No Drawing. Filed June 15, 1972, Ser. No. 263,087
Int. Cl. C07c 129/18
U.S. Cl. 260—210 E       5 Claims

ABSTRACT OF THE DISCLOSURE

Covers 11-O-methanesulfonylerythromycins which have antibiotic activity.

DESCRIPTION OF THE INVENTION

This invention relates to 11-O-methanesulfonylerythromycins which are useful as antibiotics or as intermediates in preparing other useful antibiotic compounds.

Erythromycin is produced in two forms denoted A and B by cultivating a strain of *Streptomyces erythrus* in a suitable nutrient medium as is taught in U.S. 2,653,899, Bunch et al. The structure of erythromycin is represented by the following formula:

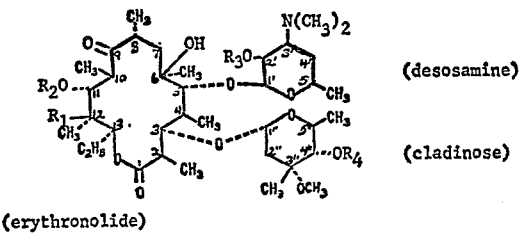

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is erythromycin A and erythromycin B.

Erythromycin, as will be noted from the formula, comprises three cyclic fragments. These fragments are referred to respectively as cladinose, desosamine and erythronolide. The positions on the cladinose ring are indiciated by double primed numbers; the positions on the desosamine ring by single primed numbers; while positions on the erythronolide ring are indicated by unprimed numbers.

In order to prepare the erythromycin derivatives here one may start with either erythromycin A or erythromycin B or the enol ethers of either. The enol ethers of erythromycin A and B and their preparation is described in Kurath et al., Experientia 27, 362 (1971). The choice of erythromycin or its enol ether depends, of course, upon the particular desired final product.

The first step in the invention is to protect the 2' and 4'' positions of erythromycin. This is best accomplished by preparing the 2'-O-acetyl-4''-O-formyl derivative via the method outlined in co-pending, commonly assigned application bearing Ser. No. 119,418, filed Feb. 26, 1971, now U.S. Pat. No. 3,736,313.

The second step involves treating the above protected erythromycin derivatives with a methanesulfonating agent such as methanesulfonic anhydride or methanesulfonyl chloride usually carried out in an acid acceptor such as pyridine.

In order to form the hemiacetal of 11-O-methanesulfonylerythromycin A one need only treat the 11-methanesulfonyl-2'-O-acetyl-4''-O-formylerythromycin A with methanol. At the present time there is no evidence of formation of the corresponding erythromycin B hemiacetal.

In another sequence of reactions one may take erythromycin A, protect the 2', 4'' groups, form the enol ethers of the particular erythromycin A, and lastly form the methanesulfonyl derivative.

The following examples illustrates fully the preparation of the derivatives of the invention.

EXAMPLE I

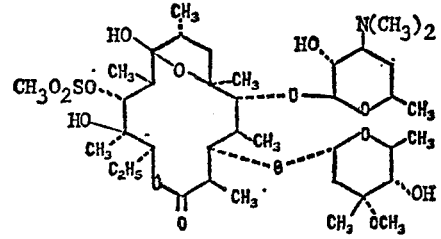

11-O-Methanesulfonylerythromycin A 6,9-Hemiacetal

A suspension prepared from 14.4 g. of 2'-O-acetyl-4''-O-formylerythromycin A[1], 7.3 g. of methanesulfonic anhydride, and 108 ml. of pyridine was stirred at room temperature for 19 hours. The reaction mixture was shaken with a mixture of 700 ml. of chloroform and 800 ml. of 5% NaHCO$_3$. The chloroform solution was washed four times with 600-ml. portions of water and dried over anhydrous magnesium sulfate. The chloroform was evaporated under reduced pressure and the residual pyridine was removed by azeotropic distillation with benzene under reduced pressure to leave 15.1 g. of 11-O-methanesulfonyl-2'-O-acetyl-4''-O-formylerythromycin A as a brown foam.

A solution prepared from 2.1 g. of 11-methanesulfonyl-2'-O-acetyl-4''-O-formylerythromycin A and 50 ml. of methanol was allowed to stand at room temperature for four days. The major portion of the methanol was evaporated under reduced pressure, and the residue was shaken with a mixture of 200 ml. of chloroform and 200 ml. of 5% NaHCO$_3$. The chloroform solution was washed with three 120 ml. portions of water, and dried over anhydrous magnesium sulfate. Evaporation of the chloroform left 1.54 g. of an orange glass.

The product thus obtained was chromatographed on a partition chromatography column to yield 686 mg. of pure 11-O-methanesulfonylerythromycin A 6,9-hemiacetal. IR: 3587, 3400–3550, 1727 cm.$^{-1}$; NMR: δ 3.29 (OCH$_3$), 3.09 (OSO$_2$CH$_3$); 2.32 (NMe$_2$), 1.54 (C$_6$—CH$_3$). The elemental analysis was in agreement with the empirical formula C$_{38}$H$_{69}$O$_{15}$NS.

EXAMPLE 2

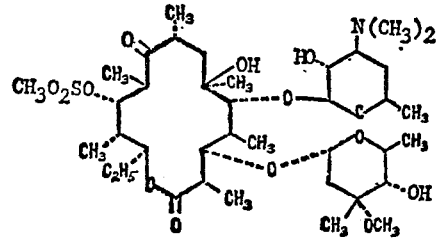

11-O-Methanesulfonylerythromycin B

A suspension prepared from 7.5 g. of 2'-O-acetyl-4''-O-formylerythromycin B, 3.6 g. of methanesulfonic anhydride and 53 ml. of pyridine was stirred at room temperature for 17 hours. The reaction mixture was shaken with a mixture of 400 ml. of chloroform and 400 ml. of 5% NaHCO$_3$. The chloroform solution was washed with water, and dried over anhydrous magnesium sulfate.

Evaporation of the chloroform under reduced pressure and removal of the residual pyridine by azeotropic distillation with benzene, under reduced pressure left 7.8 g. of 11 - O - methanesulfonyl - 2' - O - acetyl - 4" - O - formylerythromycin B as a brown foam.

A solution prepared from 13 g. of 11-O-methanesulfonyl-2'-O-acetyl-4"-O-formylerythromycin B in 350 ml. of methanol was allowed to stand at room temperature for four days. The resulting solution was treated with Darco G–60 and filtered through a celite mat. The filtrate was concentrated under reduced pressure, and the residue was shaken with a mixture of 800 ml. of 5% NaHCO$_3$ and 700 ml. of chloroform. The chloroform solution was washed with three 600-ml. portions of water and dried over anhydrous magnesium sulfate. The chloroform was evaporated under reduced pressure at room temperature to yield 10.9 g. of a light-orange glass.

The product, thus obtained, (3.09 g.) was chromatographed on a partition chromatography column to yield 320 mg. of pure 11–O-methanesulfonylerythromycin B, as a white glass, IR: 3595, 3540, 3400–3470, 1727, and 1704 cm.$^{-1}$; NMR: δ 3.31 (OCH$_3$), 3.09 (OSO$_2$CH$_3$); 2.29 (NMe$_2$).

EXAMPLE 3

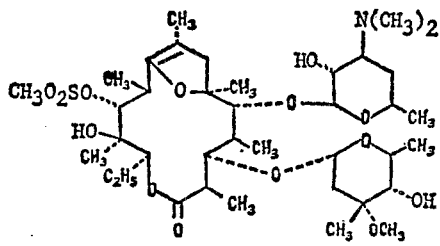

11-O-Methanesulfonylerythromycin A Enol Ether

A solution prepared from 15.5 g. of 2'-O-acetyl-4"-O-formylerythromycin A and 170 ml. of glacial acetic acid was allowed to stand at room temperature for 4 hours. The major portion of the acetic acid was evaporated under reduced pressure and the product, 2'-O-acetyl-4"-O-formylerythromycin A enol ether (14 g.) was isolated by chloroform extraction as described in Example 1.

A suspension prepared from 2.0 g. of 2'-O-acetyl-4"-O-formylerythromycin A enol ether, prepared as described above, 20 ml. of pyridine, and 1.0 g. of methanesulfonic anhydride was stirred at room temperature for 4 hours. The product, 11 - O - methanesulfonyl-2'-O-acetyl-4"-O-formylerythromycin A (2.03 g.) was isolated by chloroform extraction according to the procedure of Example 1.

A suspension prepared from 2.0 g. of 11-O-methanesulfonyl-2'-O-acetyl-4"-O-formylerythromycin A, 50 ml. of methanol, and 5 ml. of 5% aqueous NaHCO$_3$ was stirred at room temperature for 64 hours. The resulting solution was shaken with a mixture of 150 ml. of chloroform and 200 ml. of 5% NaHCO$_3$. The chloroform solution was washed with three 150 ml. portions of water and dried over anhydrous magnesium sulfate. Evaporation of the chloroform left 1.8 g. of orange glass. Partition column chromatography of 1.7 g. of this product gave 681 mg. of pure 11-O-methanesulfonylerythromycin A enol ether, M.P. 122–131°, [α]$_D^{23}$ —38°; (OCH$_3$), 3.17 (OSO$_2$CH$_3$) 2.28 (NMe$_2$), 1.58 (C$_8$—CH$_3$), 138 (C$_6$—CH$_3$). The elemental analysis was in agreement with the empirical formula C$_{38}$H$_{67}$O$_{14}$NS.

EXAMPLE 4

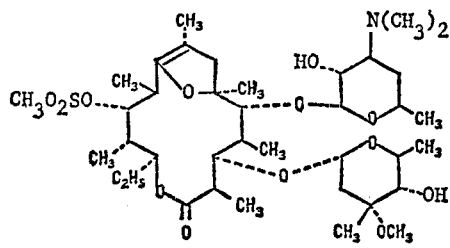

11-O-Methanesulfonylerythromycin B Enol Ether

11-O-Methanesulfonylerythromycin B enol ether may be made from 2'-O-acetyl-4"-O-formylerythromycin B via 2'-O-acetyl-4"-O-formylerythromycin B enol ether.

The compounds were then tested for their activity against gram positive and gram negative bacteria in an agar dilution test. Results are given in agar dilution units. These may be converted to MIC values (minimum inhibitory concentrations) expressed in micrograms/ml. by merely dividing the agar dilution units into the concentration and multiplying by the proper factor. Thus, for example, if one tested a sample at a cencentration of 4 mg./ml., and determined it had an activity of 10 agar dilution units, in order to determine the MIC value in micrograms/ml. one must divide the concentration of 4 by the number of agar dilution units, here 10, and multiply by 1000.

The compounds here were tested as to their activity against the following organisms:

$ECR_3$=Multiple drug resistant *Escherichia coli*
$SF$=*Streptococcus faecalis* ATCC 10541
$PA$=*Pseudomonas aeruginosa* BMH #1
$SA$=*Staphylococcus aureus* ATCC 6438P
$EC$=*Escherichia coli* ATCC 26
$BS$=*Bacillus subtilis* #10707 (University of Ill.)
$PV$=*Proteus vulgaris* ATCC 6897
$SS$=*Shigella sonnei* ATCC 9290
$ST$=*Salmonella typhosa* ATCC 9992
$KP$=*Klebsiella pneumoniae* ATCC 10031

Results are as follows:

TABLE I

|  | $ECR_3$ | SF | PA | SA | EC | BS | PV | SS | ST | KP |
|---|---|---|---|---|---|---|---|---|---|---|
| Example I, 1 mg./ml | 0 | 640 | 0 | 320 | 0 | 320 | 0 | 0 | 0 | 20 |
|  |  |  | 20 |  |  |  |  |  |  | 160 RC |

TABLE II

|  | $ECR_3$ | SF | PA | SA | EC | BS | PV | SS | ST | KP |
|---|---|---|---|---|---|---|---|---|---|---|
| Example 2, 1 mg./ml | 10 | 20,000 | 10 | 5,000 | 10 | 20,000 | 0 | 10 | 10 | 160 |
|  |  | + | 20 |  |  | + |  | 20 | 20 | 320 |

TABLE III

|  | $ECR_3$ | SF | PA | SA | EC | BS | PV | SS | ST | KP |
|---|---|---|---|---|---|---|---|---|---|---|
| Example 3, 1 mg./ml | 0 | 40 | 0 | 10 | 0 | 20 | 0 | 0 | 0 | 0 |
|  |  | 80 |  | 20 |  | 40 |  |  |  |  |

The compounds were also tested against a variety of other gram negative and gram positive bacteria. Results of antibiotic activity are as follows. Figures are MIC values in terms of mcg./ml. Erythromycin B was used as a standard.

TABLE IV

| Organism | Erythromycin base | Ex. 1 | Ex. 2 | Ex. 3 |
|---|---|---|---|---|
| Staphylococcus aureus 9144 | 0.2 | 50 | 3.1 | 0.39 |
| Staphylococcus aureus Smith | 0.2 | 50 | 3.1 | 0.39 |
| Staphylococcus aureus Smith ER | >100 | >100 | >100 | >100 |
| Staphylococcus aureus Wise 155 | >100 | >100 | >100 | >100 |
| Streptococcus faecalis 10541 | 0.05 | 6.2 | 0.2 | 0.05 |
| Escherichia coli Juhl | 50 | >100 (>1,000) | >100 (1,000) | 50 |
| Klebsiella pneumoniae 10031 | 3.1 | 50 | 25 | 6.2 |
| Proteus vulgaris Abbott | >100 | >100 (>1,000) | >100 (>10,000) | >100 (1,000) |
| Proteus mirabilis Finland #9 | >100 | >100 (>1,000) | >100 (>1,000) | >100 (1,000) |
| Salmonella typhimurium Ed #9 | 25 | >100 (>1,000) | >100 (>1,000) | 25 |
| Shigella sonnei 9290 | 12 | >100 | 100 | 12.5 |
| Pseudomonas aeruginosa BMH #10 | 50 | >100 (>1,000) | >100 (1,000) | 50 |
| Streptococcus pyogenes Roper | >100 | >100 | >100 | >100 |
| Staphylococcus aureus Quinoes | >100 | >100 | >100 | >100 |
| Streptococcus pyogenes RO | >100 | | | |
| Streptococcus pyogenes Scott | 0.2 | >100 | >100 | >100 |
| Mycobacterium gallisepticum S6 | 0.5 | 50 | 0.5 | 0.05 |
| Mycobacterium granularum 19168 | 25 | 100 | 1.0 | >100 |
| Mycobacterium hyorhinis 17981 | 0.2 | 100 | 50 | >100 |
| Mycobacterium pneumoniae FH | 1.56 | 0.5 | 0.1 | 0.25 |
| Haemophilus influenzae Patterson | 0.78 | >100 | 12.5 | 1.56 |
| Haemophilus influenzae Brimm CSF | 0.78 | 50 | 3.1 | 0.78 |
| Haemophilus influenzae Shemwell | 1.56 | 50 | 3.1 | 1.56 |
| Haemophilus influenzae Illinois | 3.1 | 100 | 12.5 | 1.56 |
| Haemophilus influenzae Terry | 1.56 | 50 | 6.2 | 1.56 |
| Crithidia fascicalata | 100 | >100 | >100 | >100 |
| Trichomonas vaginalis CLMI | 100 | >100 | >100 | >100 |
| Haemophilus influenzae 9334 | 3.1 | >100 | 12.5 | 3.1 |

What is claimed is:

1. An erythromycin derivative selected from the group consisting of 11-O-methanesfulonylerythromycin A 6,9-hemiacetal, 11-O-methanesulfonylerylthromycin B, 11-O-methanesulfonylerythromycin A 6,9 enol ether, and 11-O-methanesulfonylerythromycin B 6,9 enol ether.

2. The derivative of claim 1 which is 11-O-methanesulfonylerythromycin A 6,9 hemiacetal.

3. The derivative of claim 1 which is 11-O-methanesulfonylerythromcyin B.

4. The derivative of claim 1 which is 11-O-methanesulfonylerythromycin A 6,9 enol et her.

5. The derivative of claim 1 which is 11-O-methanesulfonylerythromycin B 6,9-enol ether.

References Cited

UNITED STATES PATENTS 2,839,524  6/1958  Heinzelman et al. __ 260—210 E
3,681,323  8/1972  Kurath et al. _____ 260—210 E JOHNNIE R. BROWN, Primary Examiner C. B. OWENS, Assistant Examiner U.S. Cl. X.R.

424—181